United States Patent
Koot et al.

[11] Patent Number: 6,049,293
[45] Date of Patent: Apr. 11, 2000

[54] REMOTE CONTROL SYSTEM

[76] Inventors: Hermanus Marinus Ignatius Koot, Maarschalklaan 16, Montfoort, Netherlands, 3417 SE; Peter Van Wees, Sleper 26, Montfoort, Netherlands, 3448 WJ

[21] Appl. No.: 08/860,768

[22] PCT Filed: Jan. 3, 1996

[86] PCT No.: PCT/NL96/00007

§ 371 Date: Aug. 20, 1997

§ 102(e) Date: Aug. 20, 1997

[87] PCT Pub. No.: WO96/21286

PCT Pub. Date: Jul. 11, 1996

[30] Foreign Application Priority Data

Jan. 3, 1995 [NL] Netherlands .......................... 9500011

[51] Int. Cl.⁷ .................................................. G08C 19/00
[52] U.S. Cl. .............................. 340/825.69; 340/825.72; 348/734
[58] Field of Search .................... 340/825.69, 825.72, 340/825.44, 636, 661, 825.63, 825.59, 825.67, 825.65, 825.57, 825.31, 825.22, 825.49; 455/343; 324/433; 318/16, 558; 341/176; 307/10.2; 348/734; 359/146; 367/197

[56] References Cited

U.S. PATENT DOCUMENTS

| | | | |
|---|---|---|---|
| 5,081,402 | 1/1992 | Koleda | 318/16 |
| 5,095,308 | 3/1992 | Hewitt | 340/825.44 |

FOREIGN PATENT DOCUMENTS

| | | |
|---|---|---|
| 0452154 | 10/1991 | European Pat. Off. . |
| 2255846 | 11/1992 | United Kingdom . |
| 9621286 | 7/1996 | WIPO . |

*Primary Examiner*—Brian Zimmerman
*Assistant Examiner*—Jean B. Jeanglaude

[57] ABSTRACT

A remote control system, has a transmitter and a battery-powered receiver adapted for wirelessly receiving and processing information from the transmitter. The receiver has a receiving section adapted to be periodically switched ON and OFF in the absence of a signal intended for that receiver and to remain switched ON continuously in the presence of a signal intended for that receiver, until that signal falls away. In the presence of a signal intended for that receiver, an adjusting motor is energized for adjusting the tilting position of slats of a blind.

11 Claims, 6 Drawing Sheets

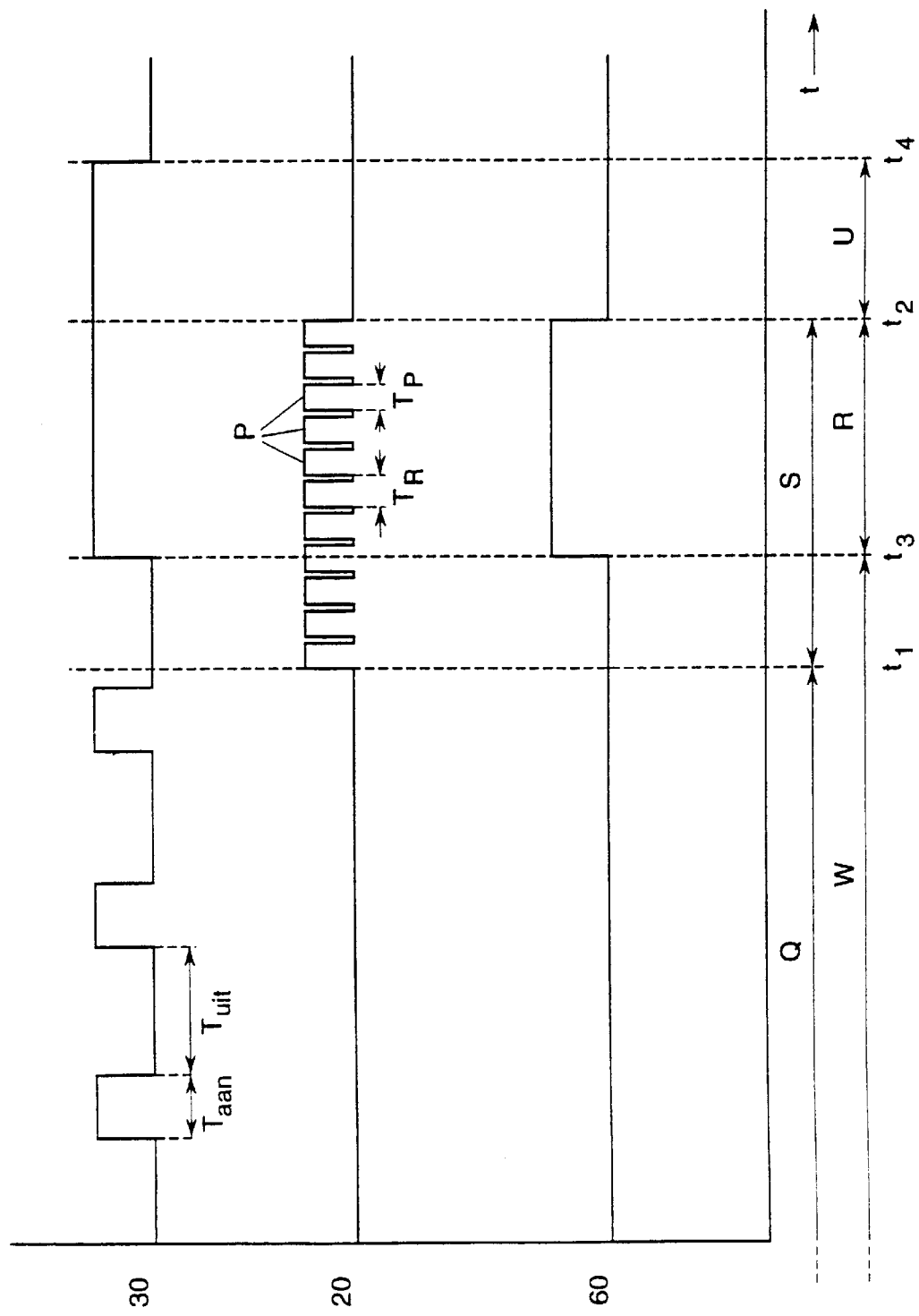

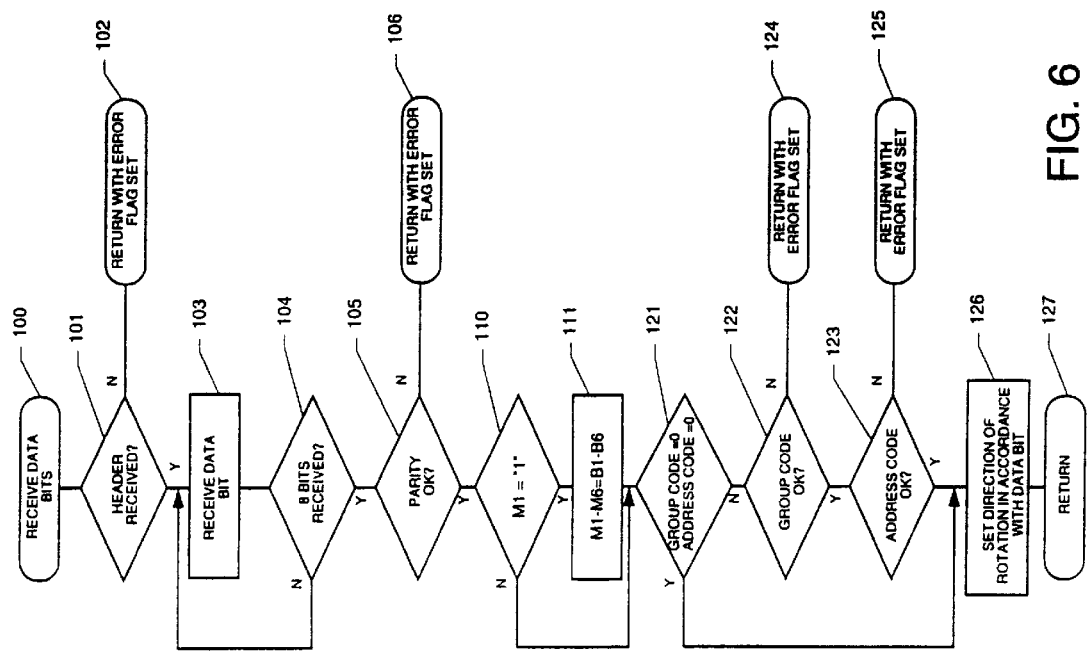
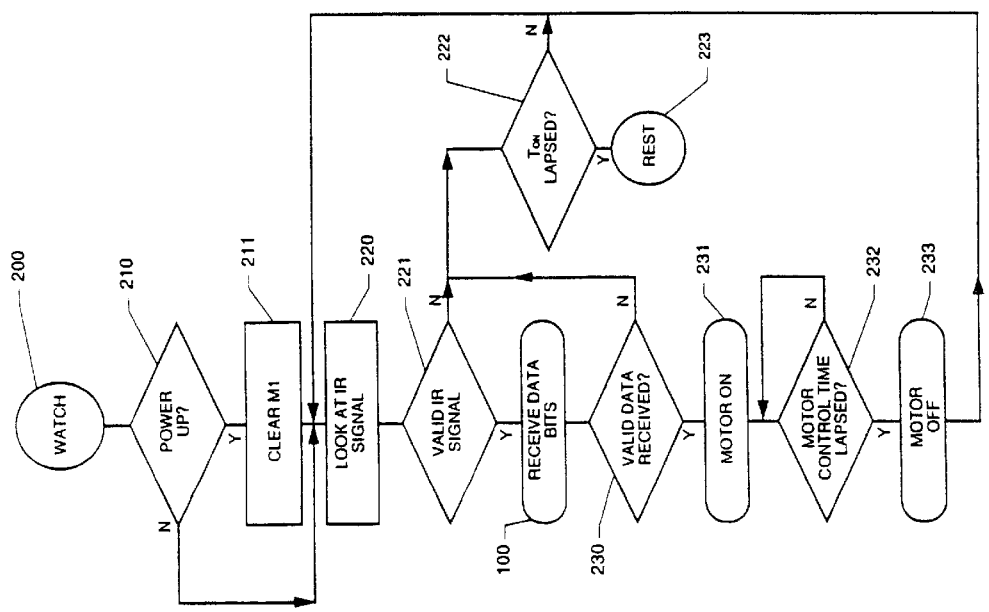
FIG. 6

REMOTE CONTROL SYSTEM

The invention relates to a remote control system, comprising a transmitter and a receiver adapted for wirelessly receiving and processing information from the transmitter.

At present, it is generally known in practice to control equipment remotely, utilizing a wireless communication path between a transmitter to be operated by a user and a receiver coupled to the equipment to be operated, for instance by means of infrared radiation or ultrasonic waves.

In general, the transmitter is powered by one or more batteries which are loaded only when the transmitter is being operated by the user, so that the energy consumption of the transmitter is relatively low. Further, it is normally not complicated to replace these batteries when they are exhausted, precisely because the transmitter is intended to be close at hand.

Normally, the remotely controlled appliance is an electric appliance, for instance a household appliance such as a television set, with the energy supply taking place via the mains. In such cases the energy consumption of the receiver coupled to that appliance hardly plays a role.

However, there are situations where the remotely controlled appliance and the receiver coupled thereto are powered by one or more batteries, without any connection with the mains. An example of such a situation is a remotely controlled blind having a battery-powered receiver. Within the framework of the present application, by a "blind" is meant: a blinding system comprising an assembly of mutually parallel slats, the slats being rotatable about their longitudinal axes in order to cover for instance a window in a variable manner. If the slats extend horizontally, the term "venetian blinds" is also used. If the slats extend vertically, the term "vertical blinds" is also used. Such window-blinding systems are generally known, and the present invention will hereinafter be explained for use in blinds. However, it is explicitly noted that the present invention is not limited to this use.

Since in the case of a remotely controlled blind having a battery-powered receiver, the battery or batteries are disposed in the proximity of the headrail of the blind, which makes it troublesome to replace the battery or batteries, it is then desirable that the necessity for replacing the battery or batteries arise as rarely as possible. It is therefore desirable that the energy consumption of the receiver be as low as possible.

The practical example described serves as an illustration of a general objective of the present invention, i.e. the provision of a receiver of control signals which has a lowest possible energy consumption.

An important difference between the receiver and the transmitter is that it is not known at the receiver end when the transmitter is transmitting. Therefore the receiver must be able to receive signals from the transmitter at all times. Accordingly, the receiver must be standby continuously, i.e. must be in a watching mode. Although in the watching mode the energy consumption of the receiver is relatively low, consumption is not nil, so that the battery discharges slowly but surely.

One way of reducing the energy consumption of the receiver is to switch the receiver ON and OFF periodically. In the ON state, the receiver checks whether signals are coming in from the transmitter. If not, the receiver returns to the OFF state again, where the receiver uses practically no energy.

A remote control system as described in the preamble of claim 1 is known from U.S. Pat. No. 5,081,402.

In practice, a plurality of remotely controlled appliances (blinds) may be present in one room. An object of the invention is to provide a system in which these blinds may be controlled individually by only one transmitter unit. More particularly, an object of the invention is to provide a system in which each individual receiver is adapted to learn which command signal is intended for that specific receiver.

A particular object of the invention is to provide a remote control system with a receiver which is particularly energy-saving, and which is capable of performing an adjustment on the basis of the time during which the transmitter is operated.

Still more in particular, the object of the invention is to provide a remote control system wherein the receiver reacts relatively promptly, i.e. to the user virtually directly, to the transmission of a transmission signal or command.

Battery-powered receivers also involve the problem that the battery powers both the receiver proper and a motor which is selectively energized by that receiver, which motor, however, can be such a load to the battery, in particular when the battery is almost exhausted, that it may happen that as a consequence of the voltage drop caused thereby, the receiver no longer acts properly. The object of the invention is also to solve this problem.

To that end, a remote control system according to the invention has the characteristics set forth in the claims.

These and other aspects, characteristics and advantages of the present invention will be further explained by the following description of a preferred embodiment of the apparatus according to the invention, with reference to the accompanying drawings, wherein:

FIG. 2 illustrates the time intervals of some states;

FIG. 6 shows a flow diagram of the operation of a receiver.

Hereinafter, the invention will be described for use for the operation of blinds. It is observed, however, that this use is only an example, and that the invention is not limited to this example.

Figure 1:
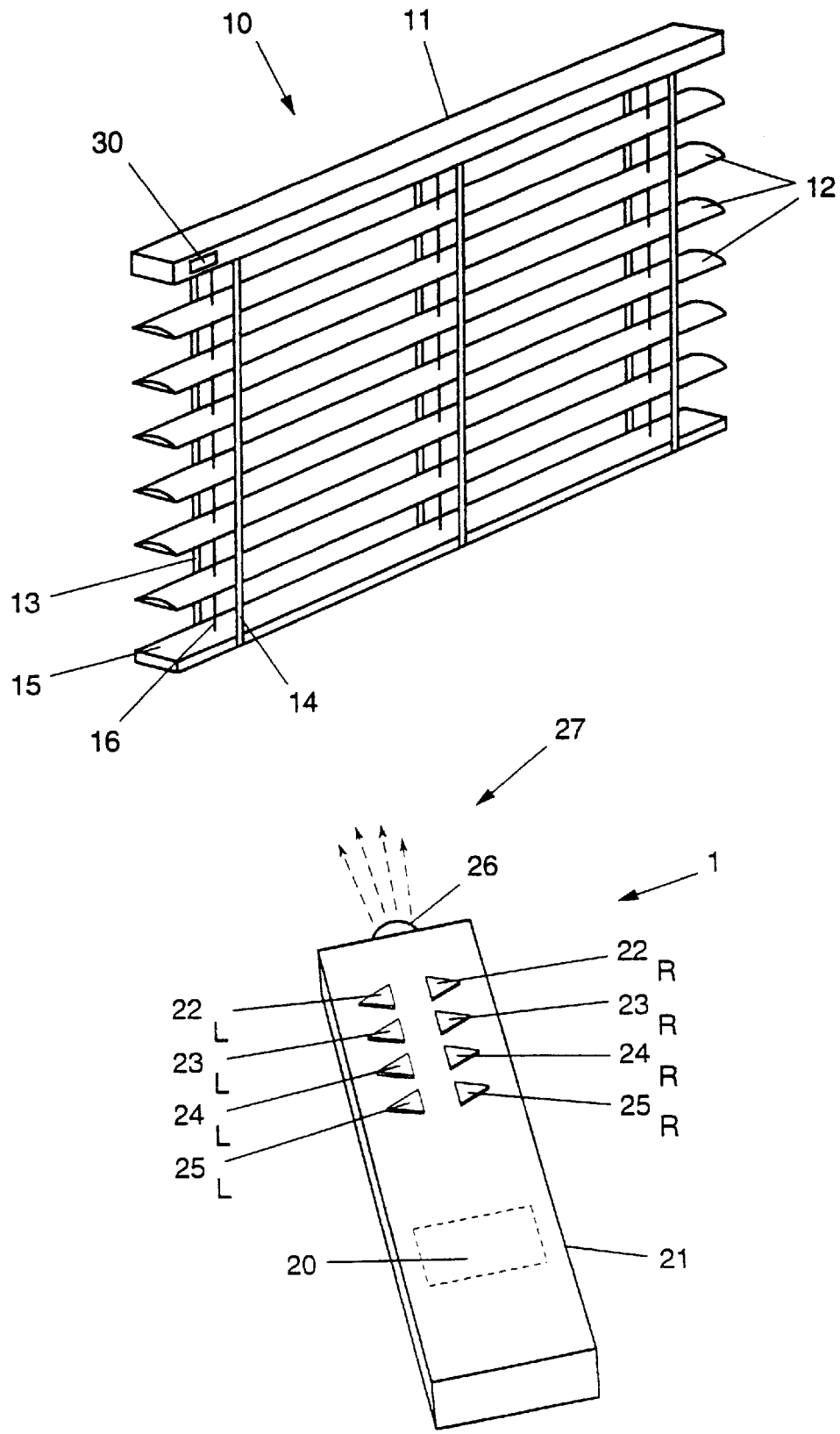
FIG. 1 is a perspective view of a blind and a transmitter.

FIG. 1 diagrammatically shows a blind 10, having a headrail 11 and horizontal slats 12. The slats 12, generally having a bent cross section, are at one longitudinal side attached to vertically directed tilting cords 13 and are at the other longitudinal side attached to vertically directed tilting cords 14. Mounted under the bottom slat 12 is a bottom rail 15, which is not only attached to the tilting cords 13 and 14, but also to a vertically directed hoisting cord 16 extending centrally through the slats 12. The tilting cords 13 and 14 are coupled to a tilting mechanism disposed in the headrail 11, while the hoising cord 16 is coupled to a hoisting mechanism disposed in the headrail 11. By operating the hoisting mechanism, the slats 12 can be hoisted, i.e. the vertical position of the bottom rail 16 can be changed. By operating the tilting mechanism, the slats 12 can be tilted, i.e. the angle of the slats 12 relative to the horizontal can be varied. As the nature and construction of the hoisting mechanism and those of the tilting mechanism do not constitute a subject of the present invention, and a skilled person need not have knowledge thereof for a proper understanding of the present invention, while, further, such hoisting and tilting mechanisms are already known per se in practice, they are not shown in the Figures and will not be further described.

Further disposed in the headrail 11 of the blind 10 is an electromotor 60 (not shown in FIG. 1 for the sake of simplicity), of which electromotor an output shaft is coupled to the tilting mechanism, so that the tilting of the slats 12 can be carried out through excitation of the motor. As the manner in which the tilting mechanism is coupled to the motor does not constitute a subject of the present invention, and a skilled person need not have knowledge thereof for a proper understanding of the present invention, while it is further known in practice to operate a tilting mechanism by means of a motor, as for instance appears from European patent application 0,452,154, this will not be further described either.

In order to be able to control the motor remotely, the blind 10 comprises a remote control mechanism according to the invention, which is generally designated by the reference numeral 1. In the embodiment shown, the remote control mechanism 1 comprises a housing 21 which can be taken in the hand by a user, with at least one group of two control buttons $22_L$ and $22_R$. The button $22_L$ serves to tilt the slats 12 to the left, while the button $22_R$ serves to tilt the slats 12 to the right. The direction of tilting corresponds to a direction of rotation of the motor, as will be understood by a skilled person.

Disposed in the housing 21 is a transmitter 20 having an output 26 for generating a transmission signal which is diagrammatically designated in FIG. 1 by 27. In FIG. 1, this transmitter 20 is indicated only diagrammatically by a dotted rectangle in the housing 21.

The remote control mechanism 1 further comprises a receiver mounted in the headrail 11 of the blind 10, which is generally designated by the reference numeral 30 in FIG. 1, for receiving the signal transmitted by the transmitter 20, which receiver 30 is coupled to the above-mentioned motor so as to optionally energize this motor on the basis of the received signal.

As is further shown in FIG. 1, in the embodiment illustrated, the housing 21 comprises three further groups of two control buttons $23_L$ and $23_R$, $24_L$ and $25_L$ and $25_R$. These buttons can be intended for operating other blinds, so that with the embodiment shown it is possible to operate four blinds or four groups of blinds independently of each other in one space. It will be understood by a skilled person that the number of groups of two control buttons may in principle by any number. In a preferred embodiment, three groups of two control buttons $22_L$ and $22_R$, $22_L$ and $23_R$, $24_L$ and $24_R$ are intended to control three different (groups of) blinds, and the fourth group of two control buttons $25_L$ and $25_R$ is intended to control all three (groups of) blinds simultaneously.

The operation of the remote control system according to the invention is illustrated in FIG. 2, wherein operating conditions of the transmitter 20, the receiver 30 and the motor 60 are represented as functions of time. In the Figure, the ratios of different durations to each other are not shown to scale.

The central line in FIG. 2 represents the operating condition of the transmitter 20. During the period designated by Q, the transmitter 20 does not transmit a signal; this period will be referred to as the operating condition "REST". or quiescent condition. During the period designated by S, the transmitter 20 does transmit a signal 27; this period will be referred to as the operating condition "TRANSMIT", or transmitting condition. The transmitter 20 reaches the transmitting condition when the user operates one of the above buttons at the point of time $t_1$, and the transmitter 20 returns to the quiescent condition when the user releases that button at the point of time $t_2$. In other words, the transmitter 20 is in the transmitting conditions as long as the user keeps a button depressed.

During the transmitting condition, the transmitter 20 transmits transmitting pulses P with a predetermined repeating period $T_R$, as is illustrated by the block-shaped configuration of the central line in FIG. 2 in the interval S. Each transmitting pulse P has a predetermined pulse length $T_P$, and contains all information in respect of a repeating command, as will be clarified later on. More in particular, each transmitting pulse P contains information in respect of the identity of the receiver for which the command is intended and information in respect of the action to be carried out by that receiver.

The top line in FIG. 2 represents the operating condition of the receiver 30. During the period designated by W, the receiver 30 is in an operating condition "WATCH" or watching mode, wherein the receiver 30 is alternately in an ON state for a predetermined period of time $T_{ON}$ and in an OFF state for a predetermined period of time $T_{OFF}$ with a predetermined repetition period. During the OFF state, a receiving unit of the receiver 30 is switched OFF, so that it consumes hardly any energy. During the ON state, that receiving unit of the receiver 30 is switched on, and incoming signals, if any, are processed and assessed. If the receiver 30 does not recognize therein a command intended for the relevant receiver 30, that receiver 30 returns to the OFF state again after an ON period had ended, to reach the ON state again only after the predetermined period of time $T_{OFF}$. This return to the OFF state upon expiry of the ON period always occurs in the absence of a transmitted signal, as is illustrated in FIG. 2 during the interval Q, but also when an incoming signal is a background signal or a signal deformed by disturbances, or a signal intended for another receiver.

If the receiver 30 during the ON state recognizes a transmission command at the period of time $t_3$, the receiver 30 ends up in an operating mode "RECEPTION", or receiving state, as is indicated by the interval R in FIG. 2. During this receiving state, the receiver 30 carries out the received command through the emission of a suitable signal to the above-mentioned motor in order to energize this motor in a desired manner. The receiver 30 remains in this receiving state R as long as the transmitting pulses P are recognized, and this motor remains energized all that time. To the user, this means that a change of the position of the slate 12 takes place as long as he keeps a button depressed. As soon as the user is satisfied with the reached position of the slats 12, he releases that button. Accordingly, the receiver 30 no longer receives any pulses P and terminates the energization of the motor 60, as illustrated by the bottom line in FIG. 2, representing the energizing state of the motor 60.

Figure 5:
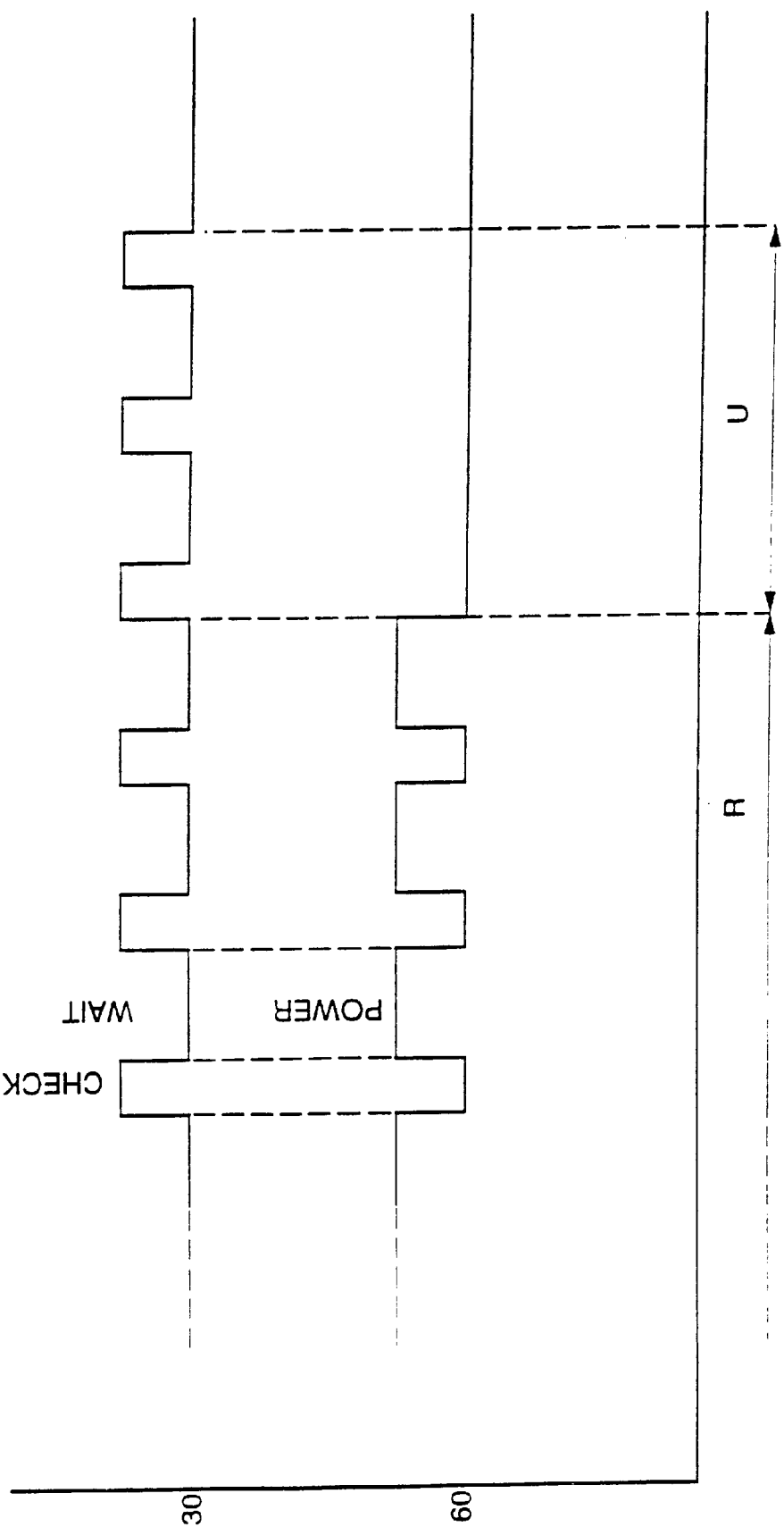
FIG. 5 is comparable with FIG. 2 and illustrates some states in more detail.

Maintenance of the ON state of the receiver 30 during the receiving state implies that the receiver should in each case check the received signal. In accordance with an aspect of the invention, that check preferably does not take place continuously, but at intervals, as is illustrated diagrammatically in FIG. 5, where the top line illustrates the operations of the receiver 30. In the Figure, the check periods are indicated as CHECK, and the intermediate periods as WAIT. In principle, the motor 60 can be energized by the receiver 30 during the CHECK period as well as the WAIT period, i.e. a truly continuous energization. In accordance with a preferred aspect of the present invention , however, the motor 60 is energized intermittently, with the energizing period of the motor, which period is indicated by POWER, coinciding with the WAIT period of the receiver, as is indicated by the bottom line in FIG. 5. This yields the advantage that the motor is not energized when the receiver 30 checks the received signal. When a battery is used as power source, a motor forms such a load to that source that the source voltage could drop, in particular when the battery is almost empty, to such a low value that the receiver could no longer function properly; this problem is avoided by the solution described.

Suitable values for the duration of the CHECK period and the POWER period are about 13 ms and about 43 ms respectively.

In principle, at the point of time $t_2$, the receiver 30 can directly return to the watching state W. In accordance with a preferred variant, however, the receiver remains in a waiting state until a point of time $t_4$, as indicated by the interval U in FIG. 2 and as further illustrated in FIG. 5, wherein the receiver 30 is active but no longer generates an energizing signal for the motor 60. Hence, this waiting state is comparable with the ON state during the watching mode, but only occurs after the operating mode "RECEPTION" has ended. One reason for this waiting state U is to make allowance for short interruptions in the transmitted signal, for instance because the user releases the button for a moment, consciously or unconsciously, and when the tramsmitted signal is resumed within the waiting state U, the receiver 30 reacts directly. Another reason is to enable the user to position the slats 12 accurately by depressing the button briefly and releasing it again. The duration $t_4$-$t_2$ for instance about 2 sec.

Preferably, the period of time $T_{ON}$ of the receiver 30 is chosen in relation to the pulse length $T_P$ of the transmitting pulses, according to the formula $T_{ON}>T_P$, to allow the receiver 30 time to process an incoming signal pulse. However, the exact moments at which a transmitting pulse P begins are not known at the end of receiver 30, and hence it is possible that a transmitting pulse P only partly coincides with the ON period of the receiver 30. The receiver 30 according to the invention has been designed to avoid this problem.

In a first structural variant, the period of time $T_{ON}$ of the receiver 30 is chosen in relation to the pulse repetition period $T_R$ and to the pulse length $T_P$ of the transmitting pulses, according to the formula $T_{ON}>T_R+T_P$, to guarantee that if the transmitter transmits pulses P, an ON period of the receiver 30 always contains at least one complete transmitting pulse P, regardless of the phase of the pulses relative to the ON period.

A second structural variant is based on the fact that for transmitting the pulses P, a carrier wave of a predetermined frequency is used; in a preferred embodiment of the remote control system according to the present invention, infrared light is used therefor. The invention provides a two-phase detection by the receiver 30, wherein the presence of a carrier wave is checked in a first phase and the presence of transmitting pulses is not checked until a second phase. If the carrier wave between two successive pulses P from the transmitter 20 is suppressed, then the switch-on time $T_{ON, 1}$ of the receiver in the first phase can be chosen in relation to the pause time between two successive pulses P, according to the formula $T_{ON, 1}>T_R-T_P$, so that in the presence of pulses, at least a portion of a pulse coincides with the switch-on time $T_{ON, 1}$. If the carrier wave between two successive pulses P from the transmitter 20 is not suppressed, then the switch-on time $T_{ON, 1}$ of the receiver in the first phase can be chosen to be still shorter, viz. as short as is minimally required for establishing the presence of a carrier wave signal. If the receiver does not detect a carrier wave signal in the first phase, which is indicative of the absence of transmitting pulses P, then the receiver 30 can return again into the OFF state directly after the switch-on time $T_{ON, 1}$ has ended.

If during the switch-on time $T_{ON, 1}$ the receiver does detect the presence of a carrier wave signal, then the ON state is prolonged in the second phase to the aforesaid $T_{ON}$, to check the presence of recognizable transmitting pulses P, as is described hereinabove. Because the switch-on time $T_{ON, 1}$ can be considerably shorter than the aforesaid $T_{ON}$, in this manner, an additional energy-saving of the receiver is possible.

It is observed that the motor is not energized during the time when the receiver is in the ON state without it having been established whether a command is being received. Since, for that purpose, at least one complete transmitting pulse P should first be received and analysed by the receiver, some time delay occurs in practice between the moment when the receiver, still in the "WATCH" mode, ends up in the ON state and the moment when the receiver shifts to the "RECEPTION" mode and the motor is energized; this time delay is not shown in FIG. 2.

Figure 3A:
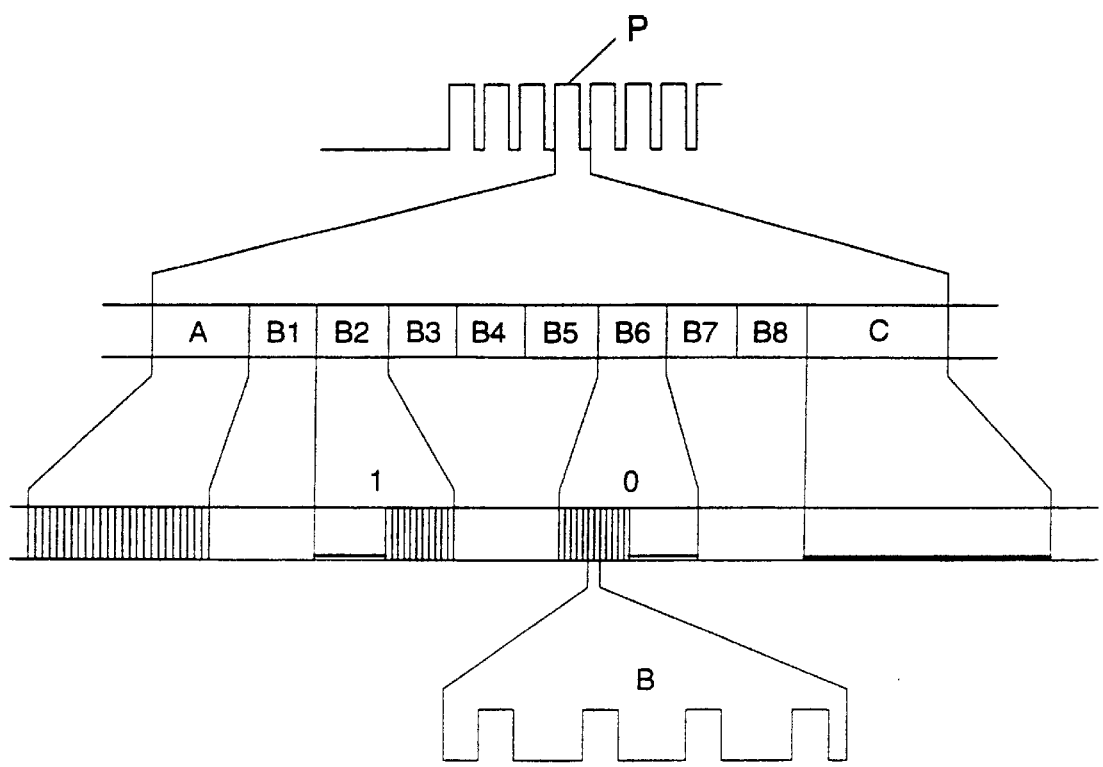
FIG. 3A illustrates an example of a coding.

Presently, with reference to FIG. 3A–B, an example will be described of a coding, found suitable, of the transmitted signals, each transmitting pulse P containing digitally coded information. The information is sent by means of infrared light. FIG. 3A illustrates the distribution of the information over a transmitting pulse P; each transmitting pulse P contains a header A of a duration of about 1.4 ms, and then eight bits B1 through B8 each of a duration of about 0.9 ms, the meaning of which will be explained later on. Thus, in this example, the pulse length $T_P$ is approximately equal to 8.6 ms. After each pulse P there follows a pause C of a duration of about 10 ms. Hence, in this example, the repetition period $T_R$ is approximately equal to 18.6 ms, which corresponds with a repetition frequency $f_R$ of about 54 Hz.

Each bit signal B1 through B8 is subdivided into two successive bit halves BH1 and BH2, only one of which contains a square-wave signal B; the other bit half is hence free of signal. The square-wave signal B consists of square waves of infrared light, which square waves have a repetition frequency of about 38 kHz with a duty cycle of 33%.

The pause C is entirely free of signal. The header A is completely filled with the square-wave signal B and serves as a synchronization signal for the receiver 30.

Each bit signal B1 through B8 is indicative of either a logical 0 (zero), or a logical 1 (one). If a bit signal is indicative of a logical 0, then the first half BH1 of that bit signal is filled with the square-wave signal B and the second half BH2 thereof is empty. If a bit signal is indicative of a logical 1, then the first half BH1 of that bit signal is empty and the second half BH2 thereof is filled with the square-wave signal B. It will be understood by a skilled person that another unequivocal coding is also possible.

In this manner, in each pulse P a binary word of eight bits B1 through B8 is transmitted. The meaning of these eight bits in this example is as follows:

| | |
|---|---|
| B1: | start bit of value 1; |
| B2, B3, B4: | group code: |
| B5, B6: | address code; |
| B7: | data bit |
| B8: | check bit. |

The check bit B8 has a value which depends on the values of the bits B1 through B7, and is intended to perform a so-called parity check.

The data bit B7 determines the direction of rotation of the motor to be operated.

With the address defined by the bits B5 and B6, which address can hence have the values 0–3, maximally four different blinds or groups of blinds can be individually controlled. In a preferred embodiment, the address 1–3 are intended to control three different blinds or groups of blinds individually, and the address 0 is intended to control all blinds jointly.

With the group code defined by the bits B2 through B4, which group code can hence have the values 0–7, the appliances to be controlled can be divided into specific groups of appliances. This enables determination whether a code is only intended for the group of blinds having vertical slats, or for the group of blinds having horizontal slats, or for groups of possible appliances to be further defined.

It will be understood by a skilled person that in principle, the number of bits to be transmitted can be chosen at will. For instance, if it is desired to operate more than three groups of different blinds individually, the number of address code bits can be increased. It is also possible to choose the number of group code bits to be two and the number of address code bits to be three.

Further, in this example, the ON time $T_{ON}$ of the receiver is chosen to be about 28 ms, to ensure that if the pulses P are transmitted as mentioned hereinbelow, during that ON time $T_{ON}$, at least one complete transmitting pulse P occurs. In the watching state, the receiver is controlled with a repetition code of about 580 ms, so that the OFF time $T_{OFF}$ is about 552 ms.

With reference to what is discussed hereinabove, it will be understood that the reaction time of the system 1, i.e. The time passing between the moment $t_1$ when the user depresses a button and the moment $t_3$ when the receiver 30 reacts with an adjustment of the slats 12, is in the most unfavorable case about 600 ms at the most, which is in every way acceptable. Further, it will be understood that on average, during the watching state, the receiver 30 is switched on for 4.8% of the time, which yields an energy-saving of a factor 20. It will be understood that the energy-saving realized can be further increased by choosing a shorter bit time or a longer OFF time.

Figure 3B:
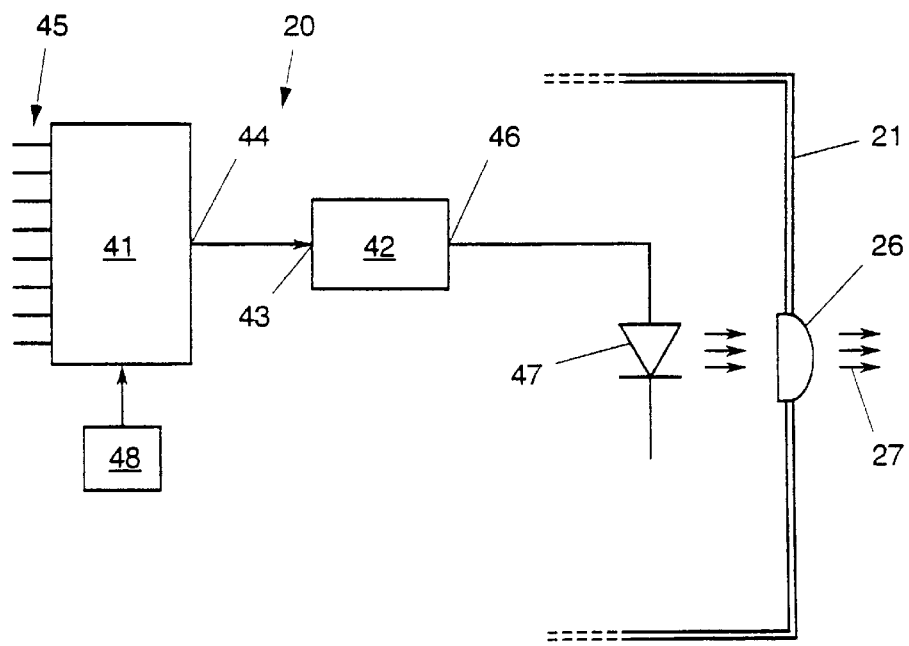
FIG. 3B shows a block diagram of a transmitter.

FIG. 3B shows a block diagram of a transmitter 20 with which infrared light pulses P with the above-mentioned coding can be generated. The transmitter 20 comprises a control unit 41 and an output element 42, of which a control input 43 is connected to a control output 44 of the control unit 41, which may for instance be a suitably programmed microprocessor. The control unit 41 has an input bus 45 which is connected to the buttons 22, 23, 24, 25.

The output element 42 has an output 46 which is connected to an infrared light-emitting diode LED 47, of which the emitted light leaves the housing 21 via an aiming lens 26. Depending on the voltage level at its control input 43, the output element 42 is either in a transmitting mode or in a silent mode. In the transmitting mode, the square waves B are transmitted; in the silent mode, no light is emitted. In this example, the output element 42 is in the transmitting mode if the level at its control input is high (H), while the output element 42 is in the silent mode if the level at its control input is low (L).

If none of the control buttons 22–25 is depressed, the control output 44 of the control unit 41 is low. The control unit 41 is adapted to supply a repeating series of control signals to its control output 44 if one of those control buttons is depressed, each control signal being built up as follows:

A: a high level with a length of 1.4 ms;

B: eight successive bit control signals BS1 through BS8 with lengths of 0.9 ms;

C: a low signal with a length of 10 ms.

Each bit control signal BS1–BS8 is a high/low signal or a low/high signal, as will be understood by a skilled person. Which of the bit control signals BS1–BS8 is a high/low signals and which are low/high signals is determined by the control unit 41, depending on the control button depressed and on a table stored in a memory 48 of the control unit 41.

It will be understood that it is also possible to program a control unit 41 such as a microprocessor so that the control unit 41 itself generates the required voltages for the LED 47, while an amplifier stage for the LED 47 may further be present, if desired. It will be understood by a skilled person which commercially available electronic building blocks are suitable for the above-discussed components 41 and 42. It will also be understood by a skilled person that it is possible to design a different circuitry exhibiting the above-discussed behavior, for instance with discrete components.

In the above-described example, the information in the transmitted signal is coded on the basis of the presence and absence of a base wave. However, it is also possible to use another coding protocol. For instance, it is possible to code the information in the transmitted signal on the basis of the use of frequency changes in a base wave. In that case, for instance, a signal of a first frequency may represent a logical "1", and a signal of a second frequency may represent a logical "0", while successive bits in a sequence to be transmitted may be separated by a third frequency.

Figure 4:
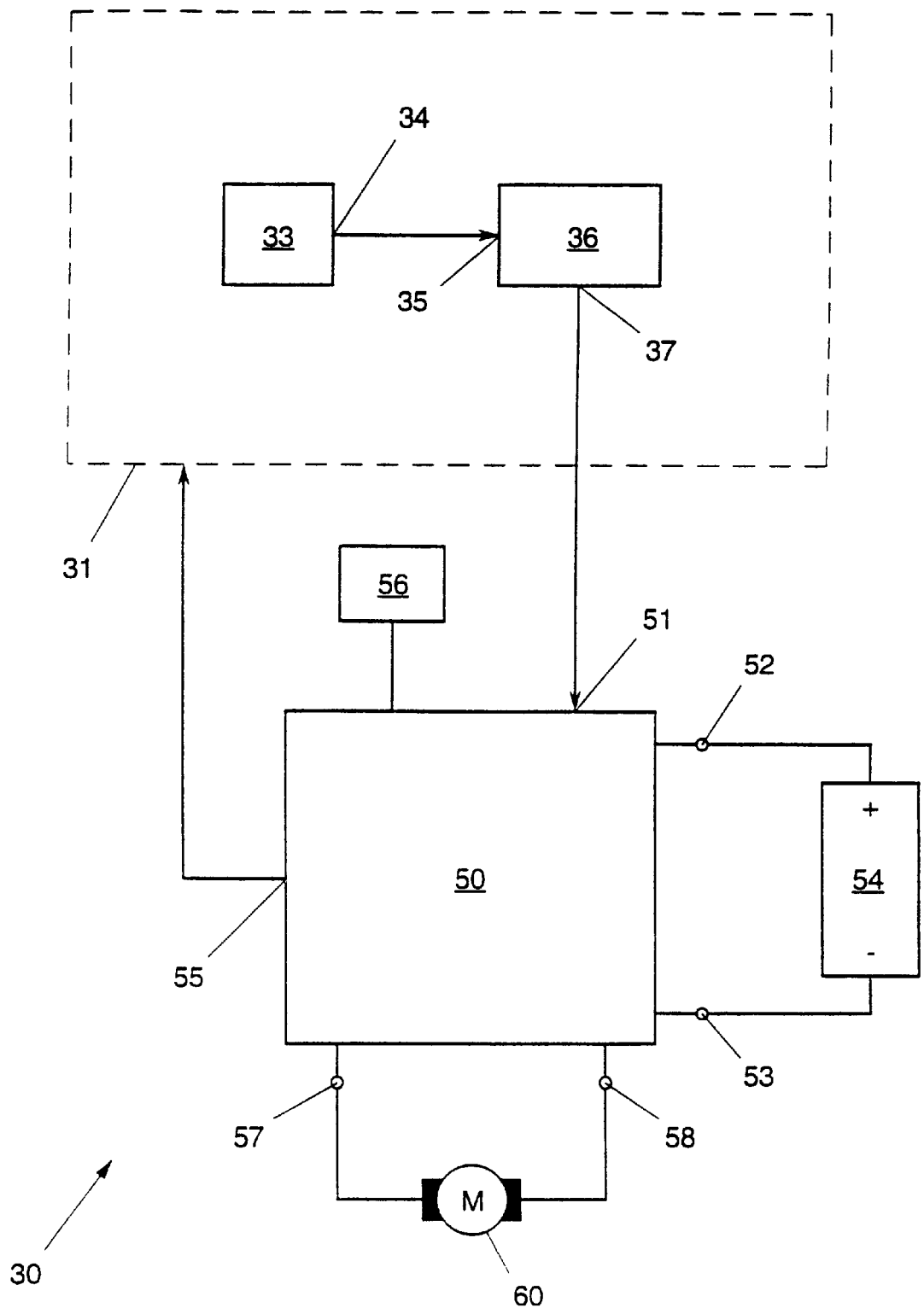
FIG. 4 shows a block diagram of a receiver.

Presently, with reference to FIG. 4, an example will be discussed of a receiver 30 intended for use with the transmitter discussed with reference to FIG. 3A–B. The receiver 30 comprises a signal-receiving and decoding section 31 and a control means 50. The signal-receiving and decoding section 31 comprises a detector 33, for instance a diode sensitive to infrared light and of a type known per se, which, at an output 34, provides an electric signal corresponding with the light signal received.

The output 34 of the detector 33 is connected to an input 35 of a converter 36 adapted to convert the output signal of the detector 33 into an 8-bit digital signal, which signal is provided in serial form at an output 37.

This output 37 is connected to an input 51 of the control means 50 which is adapted to process the input signals received at the input 51. The control means 50 has supply terminals 52, 53 which are connected to an exchangeable battery 54 of a suitable type, and is adapted to switch, via a control output 55, the signal-receiving and decoding section 31 ON and OFF with a predetermined regularity. This may be effected by providing the signal-receiving and decoding section 31 with supply voltage with that regularity, the control output 55 then being a supply output, or by controlling the components 33, 36 of the signal-receiving and decoding section 31 to an ON state or OFF state respectively, the control output 55 then being a control signal output, as will be understood by a skilled person.

The control means 50, which may be a suitable programmed microprocessor, is adapted to make an ON state last a first predetermined time (for instance 28 ms), and to compare, during that first predetermined time, signals received at the input 51 with a code stored in a memory 56, which code may consist of five memory bits M2 through M6, and to determine on the basis of those received signals whether the ON state is ended or continued.

If no or no valid signal is received, or if comparison of the received bits B2–B6 with the memory bits M2–M6 proves that the received signal is not intended for this receiver 30, then the ON state is ended after expiry of the first predetermined time, and switched on again only after a second predetermined time (for instance 560 ms).

The control means 50 is further adapted to maintain the ON state for a third predetermined time of at least 20 ms if comparison of the received bits B2–B6 with the memory bits M2–M6 proves that the received signal is indeed intended for this receiver 30. Further, the control means 50 is adapted to prolong the ON state by that third predetermined time as long as comparison of the received bits B2–B6 with the memory bits M2–M6 proves that the received signal is indeed intended for this receiver 30, and to energize the motor 60 coupled to the tilting-operating mechanism of the slats 12 during that time. To that end, output terminals 57, 58 of the control means 50 are connected to supply terminals of the motor 60, and the control means 50 is adapted to connect the output terminal 57 to the input terminal 52 and to connect the output terminal 58 to the input terminal 53, or to connect the output terminal 57 to the input terminal 53 and to connect the output terminal 58 to the input terminal 52, depending on the desired direction of rotation of the motor 60 as determined by the value of the received bit B7. In addition, the control means 50 is adapted to limit the current through the motor 60 to a predetermined maximum value so as to limit the maximum torque producible by the motor 60 at its output shaft. This prevents damage to the mechanism if, by some cause, the slats 12 cannot tilt when the motor 60 is energized, for instance because they have reached their extreme position. Normally, limit switched are used for this purpose, but these are relatively expensive and require space and additional wiring.

The above process repeats itself as long as the signal received at the input 51 corresponds with the same code, during which time the motor 60 remains energized, preferably intermittently, as mentioned above. The control means 50 is adapted to disconnect the connection of the output terminals 57, 58 to the input terminals 52, 53 if the signal is no longer received or if the received code B2–B6 changes, but to maintain the ON state for a fourth predetermined time, for instance 2 sec, and to end it if still no signal or "proper" code is then received.

The code M2 through M6 in the memory 56 can be set by means of hardware, for instance by setting five switches or jumpers. This can be carried out by the supplier or by the user. In a preferred embodiment, however, the code M2–M6 is set by means of software through the control means 50. The memory 56 can be a RAM memory with at least 6 memory locations M1–M6, the memory location M1 being a check location. If a valid code is stored in the RAM memory 56, the value of the check location M1 is a logical "1"; if the code is absent or invalid, M1 is a logical "0". For changing the code, the control means 50 can be provided with a reset switch, not shown, and the control means 50 can be adapted to make the value of M1 equal to "0" in response to the reception of a reset signal. Also when voltage of the battery 54 is interrupted, the value of M1 becomes equal to "0", just as the value of M2–M6; the RAM memory is erased upon removal of the battery.

In this embodiment, the control means 50 is adapted to read the memory location M1 first. If the value thereof is "1", the above-described operations are performed. However, if the value thereof is "0", the control means 50 copies the value of the received bits B2–B6 to the memory locations M2–M6, and writes the value "1" in the memory location M1. If the value of the bit b1 is "1", as mentioned above, the control means 50 can also simply copy the value of the received bits B1–B6 to the memory locations M1–M6.

As a result, the receiver 30 is "self-learning", which means an increased control convenience. Then, when a blind has just been installed (or reset), a user can determine in a quick and simple manner to which button on his remote control this blind should react in the future, by transmitting a command with that button. The receiver reads the first incoming addressing in the received signals and records this addressing in its memory, and henceforth considers this to be "its own address".

The operation of this preferred embodiment will be discussed in more detail with reference to the flow diagram of FIG. 6. First, the steps for receiving the data bits will be described with reference to the right-hand flow diagram in FIG. 6 (subroutine 100).

In step 101, it is checked whether a correct header A has been received. If not, subroutine 100 is ended with an error flag set (step 102).

If a correct header A has been received, a data bit is read in at step 103, and this step 103 is repeated (step 104) until 8 data bits have been read in. Next, at step 105, a parity check is carried out. If an error is detected, subroutine 100 is ended with an error flag set (step 106).

Next, at step 110, the memory 56 is examined. The memory 56 can be formed by a fixed hardware setting, for instance of switches or jumpers, in which case the first bit M1 of the memory 56 will always be set at "1". The memory 56 can also be formed by memory locations in a RAM memory. If it appears at step 110 that the memory 56 is empty, at least that the first bit M1 of the memory 56 is "0", then, at step 111, the memory bits M1–M6 of the memory 56 are made equal to the received bits B1–B6, with B1 being "1". If it appears at step 110 that the memory 56 contains a valid code (group code and address code), at least that the first bit M1 of the memory 56 is "1", then step 111 is skipped.

Next, at steps 121–123, it is determined whether the addressing (group code and address code) contained in the received bits B1–B6 corresponds with the addressing recorded (by means of hardware or software) in the memory 56 or with a general coding (step 121). If that is not the case, either because the group code does not correspond with the group code recorded in the memory 56 (step 124) or because the address code does not correspond with the address code recorded in the memory 56 (step 125), then the received command is not intended for the receiver 30 in question, and the subroutine 100 is ended with an error flag set. If the received command is indeed intended for the receiver 30 in question, then the direction of rotation of the motor 60 is determined in accordance with the value of the data bit B7 (step 126), and subroutine 100 is ended without an error flag (step 127).

The flow diagram in the left half of FIG. 6 illustrates the operation of the control means 50.

At step 200, the operation of the control means 50 starts. Through the interrogation of a special status bit, it is first checked, at step 210, whether this is the first time that the control means operates after interruption of the supply voltage (POWER UP), in which case, at step 211, the memory 56 is erased; if not, step 211 is skipped.

At step 220, the signal received at the input 51 of the detector 33 is observed, and at step 221 it is determined whether this is a valid control signal. If not, it is examined at step 222 whether the present time $T_{ON}$ has meanwhile lapsed; if this is not yet the case, step 220 is proceeded with; if this time $T_{ON}$ has indeed lapsed, the device returns into the rest position at step 223.

When, at step 221, it appears that a valid control signal is received, then subroutine 100 is carried out to decode the control signal. When this subroutine has ended, the error flag is examined at step 230 to check whether that signal contains a command intended for the receiver 30 in question. If that is the case, then, at step 231, the motor 60 is energized according to the desired direction of rotation, which energization is maintained at step 232 for a preset time (the period POWER in FIG. 5. If that preset time (for instance about 43 ms) has lapsed, then, at step 233, the motor is switched off again and step 220 is returned to in order to examine the control signal again (the period CHECK in FIG. 5). To this end, this examining step 220 contains a relatively short wait loop, not shown separately for the sake of simplicity, to give the supply voltage an opportunity to recover from the load formed by the motor 60.

If, at step 230, the received signal does not prove to contain a command intended for the receiver 30 in question, then step 222, mentioned before, is proceeded with.

It will be understood by a skilled person that it is possible to alter or modify the embodiments shown of the apparatus according to the invention without departing from the scope of the invention as set forth in the claims. For instance, it is possible that the blind has vertical slats which are rotated about their body axes. Further, it is possible that the receiver with the motor is attached to the headrail of the blind on the outside of the headrail, rather than on the inside thereof.

As a variant of the example discussed with reference to FIG. 3A–B, it is also possible to have the group code consist of two bits and to have the address code consist of three bits, if it is desired to be able to control up to maximally eight blinds independently of each other. Further; it will be understood that, if so desired, it is possible to use a dataword of more or less than eight bits.

We claim:

1. A remote control system, comprising a transmitter and a receiver for wirelessly receiving and processing information from the transmitter;

wherein the receiver comprises a receiving section which is periodically switched ON or OFF in the absence of a signal intended for that receiver and to remain switched ON continuously in the presence of a signal intended for that receiver, until that signal falls away;

wherein the receiver comprises a control means for controlling the receiving section; and a memory with a predetermined number of bits defining an address of the receiver, the control means being provided with comparing means to compare address bits in the received signal with the address bits in the memory, whereafter the address bits in the memory are replaced by the address bits in the received signal if the address bits in the memory does not contain any address information or if the address bits in the memory does not indicate a valid address.

2. A remote control system according to claim 1, wherein the receiver examines the received signal at intervals during the ON state and energizes a motor after each check period unit a next check period if a signal intended for that receiver is present, and to leave that motor deenergized during each check period.

3. A remote control system according to claim 1, wherein the receiver remains switched ON during a wait time after said signal has fallen away.

4. A remote control system according to claim 1, wherein a control means of the receiver limits the current through the motor to a predetermined maximum value so as to limit the maximum torque producible by the motor at its output shaft.

5. A remote control system according to claim 1, wherein the motor is positioned near, or in a headrail of a blind and is coupled to an adjusting mechanism for slats of that blind.

6. A remote control system according to claim 1, wherein the control means couples the motor to a supply source and limits the current through the motor to a preset value.

7. A remote control system according to claim 1, wherein the transmitter transmits a pulsed signal having a pulse length $T_P$ and a pulse repetition period $T_R$, and wherein a receiving section of the receiver is switched ON, in the absence of a signal intended for that receiver, for a period of time $T_{ON}$ which satisfies $T_{ON} > T_P$, preferably $T_{ON} \geq T_P + T_g$, and subsequently is switched OFF for a period of time $T_{OFF}$ which lasts considerably longer than $T_{ON}$.

8. A remote control system according to claim 1, wherein the transmitter and the receiver transmit receive and process a pulsed signal of which each pulse comprises a predetermined number of bits, of which each bit contains a square-wave signal B in one bit half and no signal in the other bit half.

9. A receiver for use in a remote control system according to claim 1, wherein the receiver comprises a receiving section which is periodically switched ON and OFF in the absence of a signal intended for that receiver and remains switched ON continuously in the presence of a signal intended for that receiver until that signal falls away;

and wherein the receiver comprises control means for controlling the receiving section; and a memory with a predetermined number of bits defining an address of the receiver, wherein the control means compares an addressing in the received signal with these bits, and wherein the control means copies the addressing in the received signal to said bits if the memory is empty or does not contain a valid address.

10. A remote control system according to claim 3, wherein the receiver examines the received signal at intervals during the ON state and energizes a motor after each check period until a next check period if a signal intended for that receiver is present;

leaving that motor deenergized during each check period; and leaving that motor deenergized after each check period until a next check period if no signal intended for that receiver is present.

11. A blind comprising an adjusting mechanism for the slats thereof, a motor for operating that adjusting mechanism, and a receiver according to claim 1, wherein the receiver energizes the motor in the presence of a signal intended for that receiver.

* * * * *